(12) United States Patent
Chan

(10) Patent No.: US 10,572,029 B1
(45) Date of Patent: Feb. 25, 2020

(54) METHOD FOR DYNAMICALLY ADJUSTING A KEYBOARD OUTPUT SIGNAL

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

( * ) Notice: Subject to any disclaimer, the term of this patent is extended or adjusted under 35 U.S.C. 154(b) by 0 days.

(21) Appl. No.: 16/169,857

(22) Filed: Oct. 24, 2018

(51) Int. Cl.
*G06F 3/02* (2006.01)
*H01H 13/7065* (2006.01)
*G06F 3/023* (2006.01)

(52) U.S. Cl.
CPC .......... *G06F 3/0202* (2013.01); *G06F 3/0237* (2013.01); *G06F 3/0238* (2013.01); *H01H 13/7065* (2013.01)

(58) Field of Classification Search
None
See application file for complete search history.

(56) References Cited

U.S. PATENT DOCUMENTS 5,181,029 A * 1/1993 Kim .................. G06F 3/0238
341/20

* cited by examiner

*Primary Examiner* — Kenneth B Lee, Jr.
(74) *Attorney, Agent, or Firm* — Maschoff Brennan

(57) ABSTRACT

A method for dynamically adjusting a keyboard output signal is applicable to a host that is electrically connected to a keyboard, and the method includes: obtaining a mode signal, obtaining a common configuration file when the mode signal is indicated as a common mode, or when the mode signal is indicated as a custom mode. Detecting the application currently running on the host, wherein the application is in the foreground window, and obtaining the key configuration file corresponding to the application, and after the common configuration file or the keyboard configuration file is obtained, blocking the key or a combination of keys on the keyboard. And generating at least one standard key code, and outputting the custom key code combination to the host according to the at least one standard key code and selectively according to the common configuration file or the key configuration file.

5 Claims, 2 Drawing Sheets

METHOD FOR DYNAMICALLY ADJUSTING A KEYBOARD OUTPUT SIGNAL

BACKGROUND

Technical Field

The present disclosure is related to a method for adjusting a keyboard output signal, in particular to a method for adjusting a keyboard output signal according to a foreground application.

Related Art

As the computing speed of computers increases, users can execute more applications at the same time. In order to switch or operate smoothly between multiple applications, it is more convenient to use the keyboard to switch or operate the applications than by using the mouse to select the icons on the screen. Generally, the keyboard includes a typing key area, a specific function area, a numeric keypad, and an editing keypad; wherein the function keys (Function Key, F1 key to F12 key) located in the specific function area have provided the functions which printed on the key cap, such as renaming, searching, rearranging, etc.

However, since the number of existing function keys on the keyboard is limited, and a single key can only perform a single function, the user often has to continuously use a plurality of function keys to complete a series of operations in practical applications. As the number of applications that users perform at the same time, such as office software, illustrating software, web browsers, games, etc.; the limited number of function keys limits the new features that can be added, which in turn leads users to spend extra time to make trade-offs on settings, such as considering quick-action items to be set to individual function keys. Once a new application is installed, the user may have to migrate to the application and be forced to modify the previously set script file. Repeating the button setting and reloading one of the multiple script files that have been set up undoubtedly bring a lot of inconvenience and trouble to the user.

SUMMARY

In view of this, the present disclosure is to provide a method of dynamically adjusting the keyboard output signal, thereby solving the various inconveniences mentioned above.

A method for dynamically adjusting a keyboard output signal according to an embodiment of the present disclosure is applicable to a host that is electrically connected to a keyboard. The method includes: obtaining a mode signal, and obtaining a common configuration when the mode signal is indicated as a common mode, and detecting the currently running application of the host when the mode signal is in the custom mode, wherein the application is in the foreground window; obtaining the button configuration file corresponding to the application is obtained, and the button configuration file is a default configuration file or a custom configuration. After obtaining a common configuration file or a key configuration file, blocking at least one standard key code generated by a key or a key combination pressed by the user on the keyboard, wherein the key combination includes a plurality of keys, and selecting according to the at least one standard key code whether the custom key combination output to the host is according to the common configuration file or the key configuration file.

A method for dynamically adjusting a keyboard output signal according to an embodiment of the present disclosure, wherein before obtaining the mode signal, the method further comprises: obtaining a hardware identification code of the keyboard, the hardware identification code including the product identification code and the supplier identification code, and confirming whether the hardware identification code exists in the identification code list; and obtaining the mode signal further comprises: when the hardware identification code exists in the identification code list, obtaining the mode signal. After confirming that the hardware identification code exists in the identification code list, the method further includes: confirming the configuration file list corresponding to the hardware identification code; and confirming whether the configuration file list has a custom configuration file corresponding to one of the applications; When there is a custom configuration file corresponding to the application in the configuration file list, the custom configuration file is used as the key configuration file; otherwise, the default configuration file in the configuration file list is used as the key configuration file.

A method for dynamically adjusting a keyboard output signal according to an embodiment of the present disclosure further includes outputting a scan key code before outputting the custom key code combination. The custom combination key code is used to execute shortcuts, applications or hyperlinks, or to output images, strings, commands, macros, single button signals or composite button signals.

In summary, the method for dynamically adjusting the keyboard output signal disclosed by the present disclosure achieves the following functions by using an embedded program that can be executed in the background of the operating system: providing a common mode and a custom mode for the user. In the common mode, a common configuration file is available for all applications. In the custom mode, the user can define the operation items corresponding to all the keys on the keyboard, save multiple sets of customized key configuration files, and automatically detect the current application to provide a button configuration file corresponding to the current application. The user only needs to go through the one-time setting, and then the embedded mode selects the common mode or the custom mode. In the common mode, the user can use these quick keys in all applications based on a single key or a combination of key set in the common profile. In custom mode, the embedded program provides automatic detection and switching mechanisms. The user can switch applications as desired, while using a default or custom single button or combination of buttons on a given keyboard to achieve a specified action item.

The above description of the disclosure and the following description of the embodiments of the present disclosure are intended to illustrate and explain the spirit and principles of the invention, and can give a further explain of the present disclosure.

BRIEF DESCRIPTION OF THE DRAWINGS

The present disclosure will become more fully understood from the detailed description given here in below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Looking at the present invention, it is intended to solve the problem that the limited function keys on the keyboard cause the user to customize too few quick operation items, and distinguish from the perspective of the application, allowing the user to select one or more keys on the keyboard. And the setting of the key configuration file is performed, thereby achieving the goal of realizing a customized complex operation item based on a simple key operation. The various steps in the method of dynamically adjusting the keyboard output signal of the present disclosure will be described in detail later.

The method for dynamically adjusting the keyboard output signal described in an embodiment of the present disclosure is implemented by an embedded program running on the host electrically connected to the designated keyboard. The embedded program is, for example, a driver that has been built into the computer or an application software that needs to be installed initially. The installation method is, for example, installation via a CD, and USB OTG (on-the-go) through the keyboard, or download and install from the original website, or download and install in the form of APP (application). After installing this embedded program, you can match the specified keyboard and dynamically adjust the keyboard output signal according to the current application.

Figure 1:
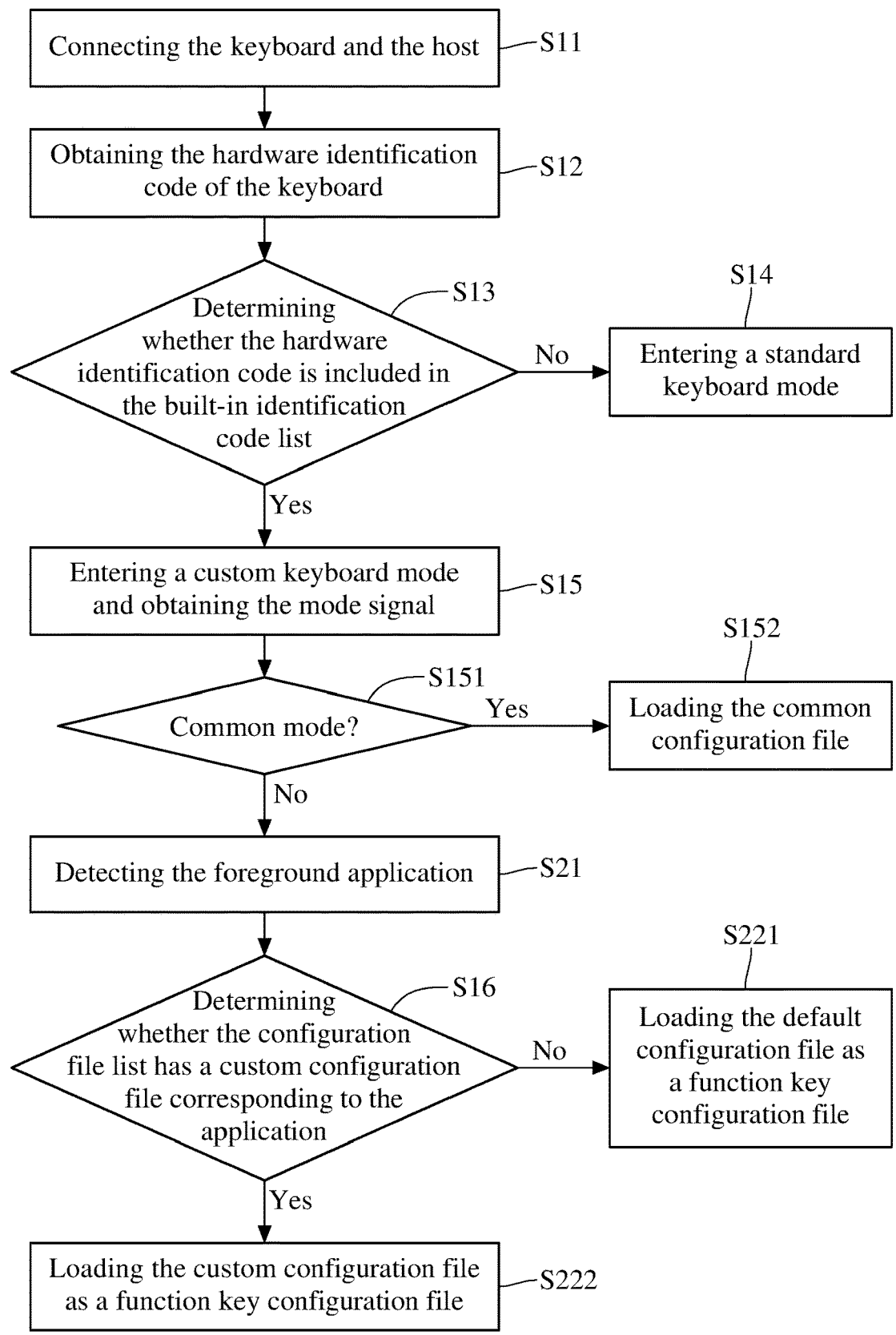
FIG. 1 is a flow chart of detecting keyboard according to an embodiment of the disclosure.

Please refer to FIG. 1, which is a flow chart of detecting a keyboard according to an embodiment of the invention. First, please refer to step S11 to connect the keyboard and the host. In particular, in practice, after the computer is turned on, the user needs to electrically connect the keyboard to the computer wirelessly or by wire. The keyboard is, for example, a 104 key, a 107 key or a 128 key. The present disclosure does not limit the number of keys on the keyboard. However, it must be explained in advance that the method for dynamically adjusting the keyboard output signal according to an embodiment of the present disclosure, It is applicable to all the keys on the specified keyboard connected, allowing the user to select one key combination formed by single or multiple keys on the keyboard to set the key profile. The embedded program can be started in principle when the writing system is loaded, or can be started by the user to select it. When the embedded program is executed, the user can also change it to not to start (do not execute) at any time, or further uninstall the embedded program.

Please refer to step S12, obtaining the hardware identification code of the keyboard. In detail, after the keyboard is connected to the host, the embedded program already running in the operating system automatically detects the hardware identification code of the keyboard. The hardware identification code includes a product ID (PID) and a vendor ID (VID).

Referring to step S13, the embedded program determines whether the hardware identification code is included in the built-in identification code list. In other words, the embedded program confirms whether or not the currently connected keyboard model is supported. In practice, in addition to automatically checking the list of identifiers stored by the embedded program, the user can also select the keyboard model that is electrically connected to the host in the list. Later, when the user purchases an additional new keyboard and connects to the host, the new keyboard can be supported by updating the embedded program.

Please refer to step S14 and step S15 together. If it is confirmed in step S13 that the hardware identification code of the keyboard connected to the host is not present in the identification code list built in the embedded program, the keyboard is regarded as a general standard keyboard and the embedded program enters a standard keyboard mode as shown in step S14, that is, the embedded program loads the configuration file of the commercially available standard keyboard. Conversely, if the hardware identification code of the keyboard currently connected to the host is found from the identification code list in step S13, the keyboard is regarded as a designated keyboard, which supports the subsequent operation of the embedded program. Thus, as shown in step S15, the embedded program enters the custom keyboard mode and obtain the mode signal.

Referring to step S151, it is determined whether the mode signal obtained in step S15 is a common signal. The mode signal, for example, the user clicks on the status window displayed on the screen, and the embedded program sends a corresponding mode signal according to the mode selected by the user. For example, a mode signal can be used to indicate two modes: a common mode and a custom mode. When the mode signal is indicated as the common mode, as shown in step S152, the embedded program loads the common profile. Basically, this common profile works for all applications. On the other hand, when the mode signal is specified as the custom mode, the embedded program will load the custom configuration file corresponding to the application according to the application executed by the current host, as described below.

Please refer to step S21, detecting the foreground application. In detail, the foreground application is an application that is being operated by a user in an operating system running after the computer is powered on, and the application is in a foreground window due to user operations. Generally, the operating system (OS) are usually Microsoft's Windows or Apple's Mac OS; however, the type of operating system is not limited to the above. It is additionally noted that after the process of step S13 to step S15 is completed, that is, the embedded program confirms that the list of identification codes of the keyboard currently connected to the host has a hardware identification code, the mode signal is obtained, and when the custom mode is assigned, the detection of the foreground application can be started. This means that the embedded program will perform foreground application detection and its subsequent steps only if the specified keyboard supported by the embedded program is connected to the host and the user selected the custom mode.

Referring to step S16, it is determined whether the configuration file list has a custom configuration file corresponding to the application detected in step S21. Specifically, in the flow of steps S13 to S15, the embedded program has confirmed that the hardware identification code of the keyboard exists in the identification code list. Next, in step S21, the embedded program confirms the foreground application. Then in step S16, the embedded program searches in the list of configuration files corresponding to the hardware identification code according to the detected application. In practice, a plurality of configuration file lists can be stored in the embedded program, and different configuration file lists correspond to keyboards of different models. At least one configuration file is included in each profile list, one of which is a preset(default) configuration file of the original factory, and the rest is a custom configuration file. The custom profile is, for example, a profile set by the user through the embedded program. The preset configuration file is, for example, a pre-configured (or pre-updated) configuration file in the embedded program, or a configuration file downloaded by the user from the original website in the future. It must be emphasized that each custom profile corresponds to an application that can run on the same computer host, and the default profile can also correspond to an application as a custom profile, or is common to all applications. The application includes a communication software such as Skype, Word, Excel, etc., or a multimedia playback software such as a Potplayer, etc., but the present disclosure does not limit the type of the application.

Please refer to step S221 and step S222 together. If the embedded program confirms that there is only one preset configuration file in the configuration file list without any custom configuration file in step S16, the embedded program loads the default configuration file as a function key configuration file as described in step S221. Otherwise, as described in step S222, the embedded program loads the custom profile as a function key profile.

The function key configuration file stores a plurality of function keys and corresponding operation items of the function keys. For example, the function key configuration file corresponding to the document application "Word" has operation items such as "shrinking font size of selected texts" and "growing font size of selected texts"; and the function key configuration file corresponding to the multimedia play application "Potplayer" has "playing the previous song", "pause " and other functions. Therefore, when the embedded program detects that the foreground application is "Word" in step S21, and finds a custom profile corresponding to the application "Word" in the profile list in step S16, the function key configuration file loaded in step S21 includes the functions of "shrinking font size of selected texts" and "growing font size of selected texts". Similarly, when the current application is a "Potplayer", the loaded configuration file includes the functions of "playing the previous song" and "pause".

Figure 2:
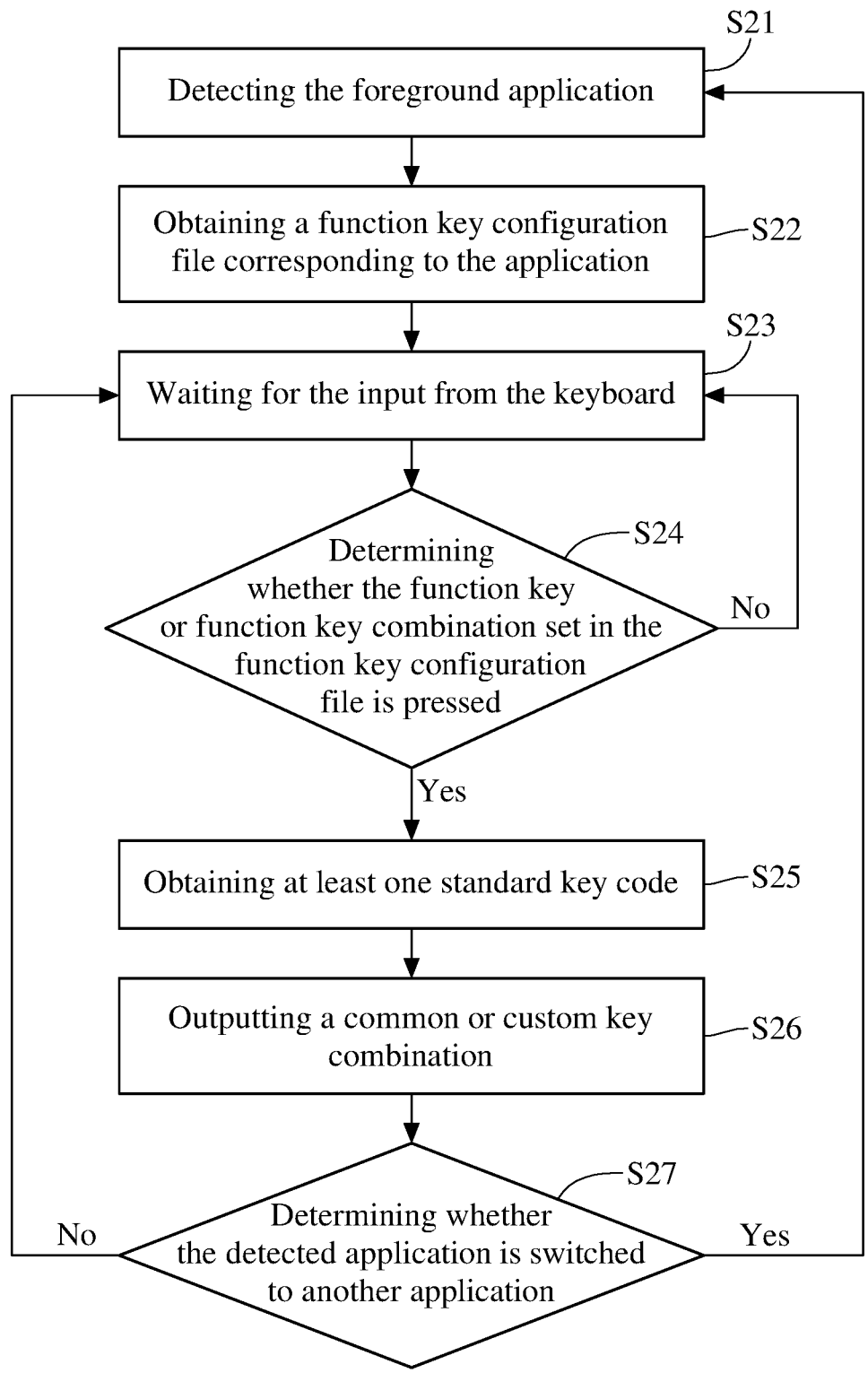
FIG. 2 is a flow chart of adjusting keyboard output signals according to an embodiment of the disclosure.

Please refer to FIG. 2, which is a flow chart of adjusting keyboard output signals according to an embodiment of the disclosure.

Please refer to step S21 to detect the foreground application. This step is an equivalent to step S21 of FIG. 1 and will not be described again here.

Please refer to step S22, obtaining a function key configuration file corresponding to the application. This step corresponds to steps S221 and S222 of FIG. 1. In short, the function key configuration file is a default configuration file or a custom configuration file. When the configuration file list has a custom configuration file corresponding to the foreground application, the embedded program uses the custom configuration file as the function key configuration file; otherwise, the default configuration file is used as the function key configuration file.

Please refer to step S23 and step S24 together, which are "waiting for the input from the keyboard" and "determining whether the function key set in the function key configuration file is pressed". In detail, the embedded program waits for the input action of the user on the specified keyboard on the premise that the foreground window has not been switched by the user. After detecting the input action, as shown in step S24, the embedded program checks whether the input action is from the action result of one or a plurality of key combinations on the keyboard. Since the user can specify a certain key or a combination of some keys on the keyboard as a new quick key in the custom configuration file. Therefore, in step S24, the embedded program acquires a key having a custom function suitable for the current application according to the key configuration file loaded in step S22, and detects whether the key having the custom function is pressed.

Please refer to step S25, obtaining the standard key code. Specifically, the embedded program blocks an electronic signal sent from the designated keyboard to the host, and the electronic signal is a standard key code generated by the user pressing a function key. For example, the standard key code of the Ctrl key is 7, the standard key code of the Tab key is 9, . . . , and the standard key code of the A key is 65. In addition, at least one of the same keys is repeatedly pressed for a short preset time (for example, pressing the A button 3 times within 0.5 seconds) can also be regarded as a key combination.

Referring to step S26, a custom key combination or a common key combination has been output. Specifically, the key combination is different depending on the mode selected by the user in step S15. In detail, if the user selects the common mode in step S151, in this step S26, the embedded program searches for the common profile according to the at least one standard key code intercepted in step S25 to obtain the corresponding common key combination of the key pressed by the user. On the other hand, if the mode signal is in the custom mode in step S151, the embedded program searches for at least one standard key code intercepted in step S25 according to the key configuration file corresponding to the current application obtained in step S22. The custom key combination that is set corresponding to the key pressed by the user is obtained. The embedded program then sends this common or custom key combination back to the operating system. It must be specifically stated that the common key combination is suitable for all applications. In other words, in the common mode, the same button pressed by the user in a plurality of different applications will correspondingly send the same common key combination. In contrast, the custom key combination combines the pre-configured custom key combinations in each application, depending on the application. In practice, before outputting the general or custom key combination, it further includes outputting a scan key code. The scan key code, or also can be called as "keyboard scan code", is a data transmitted by most of the keyboards to a computer to report which keys are pressed. For example, the scan key code of the IBM keyboard is "E0" represented by 16 bits. The custom key combination is the control signal of the operation item corresponding to the key pressed in step S24 in the key configuration file corresponding to the foreground application. The operation items include, but are not limited to, opening a shortcut, an application or a hyperlink, or outputting an image, a string, an instruction, a macro, a single button signal, or a composite button signal.

In practice, when executing an application, the user can press a key combination formed by a single key or a plurality of key set in the key configuration file of the application to achieve, for example, opening the file menu and selecting the most recently opened file list, formatting of the selected items, and other operational items that would otherwise require cumbersome steps. In addition, for the same single key or multiple key combinations, different functions can be set according to different applications. For example, pressing the F1 and N keys simultaneously in the application Word can count the number of words in the file, while pressing the same key combination in the application Potplayer will randomly play all the music files in the specified folder.

Please refer to step S27, determining whether the detected application is switched to another application. In detail, after the step S26 is completed, the embedded program checks whether the foreground window at this time has been switched by the user. If yes, return to step S21 to re-detect the application currently in the foreground window, and then perform the method of dynamically adjusting the keyboard output signal according to the foregoing steps S21 to S26 according to an embodiment of the present disclosure. Conversely, if the user does not switch the currently operating application, the process returns to step S23, and the embedded program waits for the next keyboard input operation, and then executes the method of dynamically adjusting the keyboard output signal according to the flow of steps S23 to S26 according to the embodiment of the present disclosure.

Therefore, through the method of dynamically adjusting the keyboard output signal introduced in steps S21 to S27, the user can save time that had to be subjected to cumbersome operation steps before to achieve the same function, and also saves the time to load the key configuration file when switching different applications.

In summary, the method for dynamically adjusting the keyboard output signal of the present disclosure is able to detect the keyboard currently connected to the host through the embedded program. When it is confirmed that the model of the keyboard can be supported, and the user chose the custom mode, then according to the foreground application that the user is operating currently, the function key configuration file corresponding to the keyboard model and the application is loaded, so that the user can press the function key. A custom key combination corresponding to this function key is generated to facilitate the user's quick operation in the application. The present disclosure can automatically switch to the function key configuration files corresponding to these applications according to different applications, so the user does not need to be limited by the number of function keys, and can set his own favorite function key operation items for each application. In addition to the custom mode described above, the present disclosure also provides a common mode and corresponding common configuration file suitable for all applications. In general, the method for dynamically adjusting the keyboard output signal described in the present disclosure can be selected on the hardware according to different keyboard models, and the user can select a single key on the keyboard or a combination of a plurality of key to set a key configuration file, thus provides a more diverse shortcut key customization operations and gives the user a smoother operating experience.

What is claimed is:

1. A method for dynamically adjusting a keyboard output signal, which is suitable for electrically connecting a host of a keyboard, the method comprising:
   obtaining a product identification code and a supplier identification code of the keyboard;
   confirming whether the product identification code and the supplier identification code exist in an identification code list;
   obtaining a mode signal when the product identification code and the supplier identification code exist in the identification code list;
   obtaining a default configuration file when the mode signal indicates a common mode; or
   detecting an application that is currently running by the host when the mode signal indicates a custom mode, wherein the application is in a foreground window, and obtaining a key configuration file corresponding to the application;
   intercepting at least a standard key code generated by pressing a key or a key combination of the keyboard after obtaining a common configuration file or the key configuration file, wherein the key combination comprises a plurality of keys; and
   outputting a custom key code combination to the host according to the at least one standard key code and selectively according to the common configuration file or the key configuration file.

2. The method for dynamically adjusting a keyboard output signal according to claim 1, wherein after confirming that the product identification code and the supplier identification code exists in the identification code list, the method further comprises:
   confirming a list of configuration files corresponding to the product identification code and the supplier identification code;
   confirming whether there is a custom configuration file corresponding to the applications in the configuration file list;
   wherein, when the configuration file list has the custom configuration file corresponding to the application, the custom configuration file is used as the key configuration file; when the configuration file list does not have the custom configuration file corresponding to the application, the default configuration file in the configuration file lists is used as the key configuration file.

3. The method for dynamically adjusting the keyboard output signal according to claim 1, wherein the key configuration file comprises a default configuration file and a custom configuration file.

4. The method for dynamically adjusting the keyboard output signal according to claim 1, wherein outputting of the custom key code combination further comprises outputting a scan key code.

5. The method for dynamically adjusting the keyboard output signal according to claim 1, wherein the custom combination key code is used to open a shortcut, an application or a hyperlink, or to output an image, a string, an instruction, a macro, a single button signal or a composite button signal.

* * * * *